(12) United States Patent
Friesen et al.

(10) Patent No.: US 9,269,996 B2
(45) Date of Patent: Feb. 23, 2016

(54) FILTER FOR ELECTROCHEMICAL CELL

(71) Applicant: FLUIDIC, INC., Scottsdale, AZ (US)

(72) Inventors: Cody A. Friesen, Fort McDowell, AZ (US); Ramkumar Krishnan, Scottsdale, AZ (US); Grant Friesen, Scottsdale, AZ (US); Joel R. Hayes, Scottsdale, AZ (US)

(73) Assignee: FLUIDIC, INC., Scottsdale, AZ (US)

( * ) Notice: Subject to any disclaimer, the term of this patent is extended or adjusted under 35 U.S.C. 154(b) by 609 days.

(21) Appl. No.: 13/666,864

(22) Filed: Nov. 1, 2012

(65) Prior Publication Data

US 2013/0115533 A1   May 9, 2013

Related U.S. Application Data

(60) Provisional application No. 61/556,000, filed on Nov. 4, 2011.

(51) Int. Cl.
*H01M 8/06* (2006.01)
*H01M 12/06* (2006.01)
*H01M 2/12* (2006.01)

(52) U.S. Cl.
CPC .............. *H01M 12/065* (2013.01); *H01M 2/12* (2013.01); *H01M 2/1205* (2013.01); *H01M 2/1258* (2013.01); *H01M 2/1264* (2013.01)

(58) Field of Classification Search
CPC . H01M 12/065; H01M 12/02; H01M 12/085; H01M 2/1258; H01M 2/1264; H01M 2/1205; H01M 2/1229; H01M 2/12; B01D 19/0031; B01D 53/266
See application file for complete search history.

(56) References Cited

U.S. PATENT DOCUMENTS

| | | | | |
|---|---|---|---|---|
| 4,331,460 A | * | 5/1982 | Dillmann et al. | 55/485 |
| 4,336,043 A | * | 6/1982 | Aonuma et al. | 55/483 |
| 4,484,936 A | * | 11/1984 | Sakai | 96/219 |
| 5,131,387 A | * | 7/1992 | French et al. | 128/205.27 |
| 5,707,757 A | * | 1/1998 | Lee | 429/86 |
| 2004/0031251 A1 | * | 2/2004 | Priess | 55/485 |
| 2004/0086779 A1 | * | 5/2004 | Higley et al. | 429/86 |
| 2006/0107639 A1 | * | 5/2006 | Hamlin et al. | 55/498 |
| 2009/0284229 A1 | | 11/2009 | Friesen et al. | |
| 2010/0119895 A1 | | 5/2010 | Friesen et al. | |
| 2010/0285375 A1 | | 11/2010 | Friesen et al. | |
| 2010/0316935 A1 | | 12/2010 | Friesen et al. | |
| 2011/0039181 A1 | | 2/2011 | Friesen et al. | |
| 2011/0045325 A1 | * | 2/2011 | Anzai et al. | 429/53 |
| 2011/0070506 A1 | * | 3/2011 | Friesen et al. | 429/404 |
| 2011/0086278 A1 | | 4/2011 | Friesen et al. | |

(Continued)

OTHER PUBLICATIONS

Chinese Office Action dated Feb. 19, 2013 (with partial English Language translation) of Chinese Patent Appln. No. 201220585211.2 filed Nov. 16, 2012 (4 pages).

*Primary Examiner* — Milton I Cano
*Assistant Examiner* — Michael Dignan
(74) *Attorney, Agent, or Firm* — Pillsbury Winthrop Shaw Pittman, LLP

(57) ABSTRACT

An electrochemical cell system is configured to utilize an ionically conductive liquid flowing through a plurality of electrochemical cells. One or more hydrophilic filters for venting of gas from the cells are provided along a flow path for the ionically conductive liquid, so as to permit gasses that evolve in the ionically conductive liquid during charging or discharging to vent outside the cell system, while constraining the ionically conductive liquid within the flow path of the electrochemical cell system.

18 Claims, 9 Drawing Sheets

(56) References Cited

U.S. PATENT DOCUMENTS

| | | |
|---|---|---|
| 2011/0200893 A1 | 8/2011 | Friesen et al. |
| 2011/0250512 A1 | 10/2011 | Friesen et al. |
| 2011/0316485 A1 | 12/2011 | Krishnan et al. |
| 2012/0015264 A1 | 1/2012 | Friesen et al. |
| 2012/0068667 A1 | 3/2012 | Friesen et al. |
| 2012/0139496 A1 | 6/2012 | Krishnan et al. |
| 2012/0202127 A1 | 8/2012 | Friesen et al. |
| 2012/0321969 A1 | 12/2012 | Friesen et al. |

\* cited by examiner

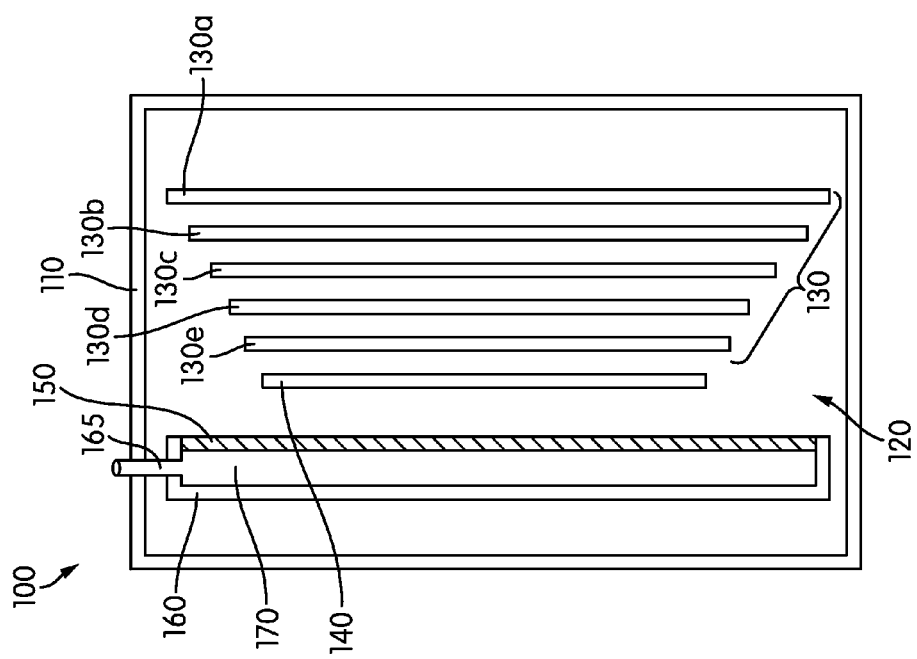
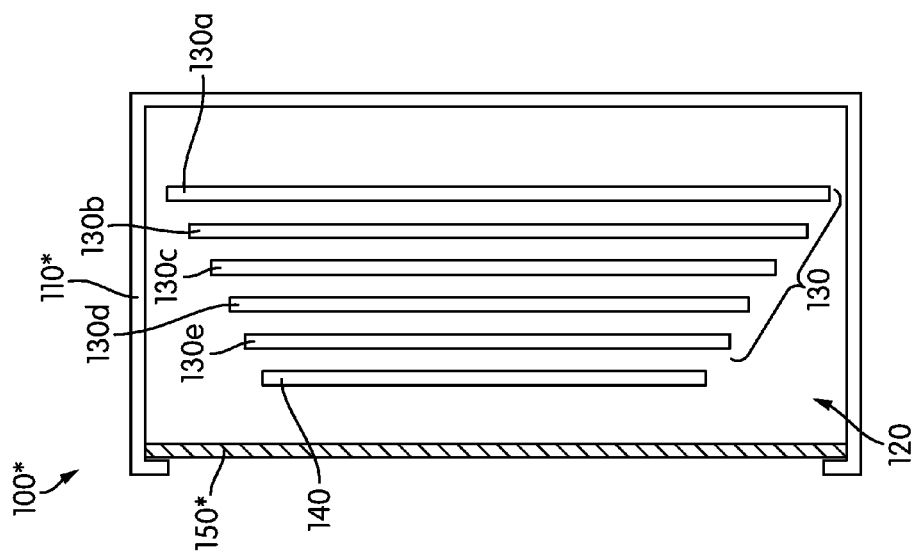

FILTER FOR ELECTROCHEMICAL CELL

This application claims the benefit of U.S. Provisional Application No. 61/556,000, filed Nov. 4, 2011, the content of which is incorporated in its entirety herein by reference.

FIELD

The present invention is generally related to electrochemical cells, and more particularly to electrochemical cells utilizing a liquid ionically conductive medium.

BACKGROUND

Many types of electrochemical cells utilize a liquid ionically conductive medium to support electrochemical reactions within the cell. For example, a metal-air electrochemical cell system may comprise one or more cells, each having a fuel electrode serving as an anode at which metal fuel is oxidized, and an air breathing oxidant electrode at which oxygen from ambient air is reduced. The liquid ionically conductive medium in such cells may communicate the oxidized/reduced ions between the electrodes.

In some electrochemical cell systems, various gasses may evolve during the charging and/or discharging of the cell. Such gasses may be harmful to the cell, and may damage or impede performance of the cell. For example, in some cases the cell may be harmed due to the evolved gasses increasing pressure within a confined area in the cell. In some cases, the cell (and potentially its surroundings) may be harmed due to the evolution of a potentially volatile gas or combination of gasses. As such, some electrochemical cells are configured to disperse such gasses by including vents therein, so that gasses may escape into the ambient environment. For example, U.S. patent application Ser. No. 13/566,948, incorporated herein in its entirety by reference, discloses a membrane gas vent configured to disperse gases out of an electrochemical cell. Other electrochemical cells may be configured with pressure relief valves, which are typically closed, however open when the pressure within the cell exceeds a threshold amount.

Among other improvements, the present application also endeavors to provide an effective and improved way of controlling the discharge of gasses within the cell without adversely affecting the flow of liquid electrolytes within the cell and/or the performance of the cell during operation.

SUMMARY

According to an embodiment, an electrochemical cell system includes a fuel electrode comprising a metal fuel and an oxidant electrode for absorbing and reducing a gaseous oxidant. The electrochemical cell system also includes a chamber configured to contain a volume of ionically conductive liquid therein, wherein the ionically conductive liquid conducts ions between the fuel and oxidant electrodes, and wherein the oxidant electrode separates the ionically conductive liquid from the gaseous oxidant. The electrochemical cell system additionally includes a filter configured to separate gas in the cell from the ionically conductive liquid. The filter includes a wick configured to absorb a portion of the ionically conductive liquid therein. The filter also includes a hydrophilic body portion positioned generally above the volume of ionically conductive liquid, coupled to said wick so as to receive the absorbed portion of the ionically conductive liquid from said wick. The hydrophilic body portion contains pores therein so as to permit permeation of the gas therethrough.

Other aspects of the present invention will become apparent from the following detailed description, the accompanying drawings, and the appended claims.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIG. 1 depicts a schematic view of an electrochemical cell having an immersed oxidant reduction electrode;

FIG. 2 depicts a schematic view of an electrochemical cell having an oxidant reduction electrode which defines a boundary wall for the electrochemical cell;

DETAILED DESCRIPTION

Figure 3:
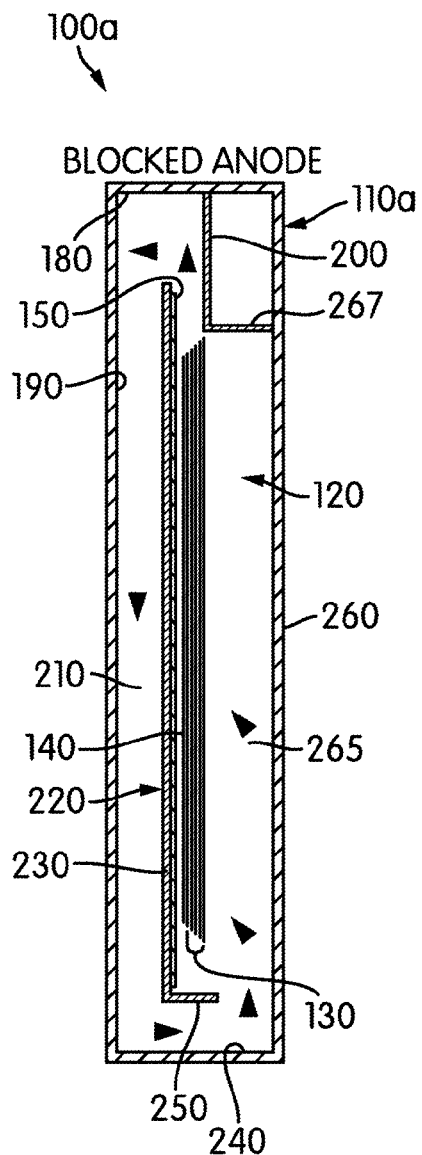
FIG. 3 depicts a schematic view of an electrochemical cell of the configuration of FIG. 1, configured for convective flow of ionically conductive medium therein, according to an embodiment.

FIG. 1 illustrates a schematic cross sectional view of an electrochemical cell 100. As shown, the components of the electrochemical cell 100 may be contained at least partially in an associated housing 110. The cell 100 utilizes a liquid ionically conductive medium that is contained within the housing 110, and is configured to circulate therein to conduct ions within the cell 100. While at times the ionically conductive medium may be generally stationary within the housing 110, such as in a stagnant zone, it may be appreciated that the cell 100 may be configured to create a convective flow of the ionically conductive medium. In some embodiments, the flow of the ionically conductive medium may be a convective flow generated by bubbles of evolved gas in the cell 100, such as is described in U.S. patent application Ser. No. 13/532,374 incorporated above in its entirety by reference.

Various portions of the electrochemical cell 100 may be of any suitable structure or composition, including but not limited to being formed from plastic, metal, resin, or combinations thereof. Accordingly the cell 100 may be assembled in any manner, including being formed from a plurality of elements, being integrally molded, or so on. In various embodiments the cell 100 and/or the housing 110 may include elements or arrangements from one or more of U.S. patent application Ser. Nos. 12/385,217, 12/385,489, 12/549,617, 12/631,484, 12/776,962, 12/885,268, 12/901,410, 13/028,496, 13/083,929, 13/167,930, 13/185,658, 13/230,549, 13/299,167, 13/362,775, 13/526,432, 13/531,962, 13/532,374, 13/566,948, and 61/556,011, each of which are incorporated herein in their entireties by reference.

While subsequent Figures illustrate the convective flow of the cell 100, FIG. 1 schematically depicts various other components and features of an embodiment thereof. Accordingly, defined within the housing 110 of the cell 100 is a cell chamber 120 that is configured to house the ionically conductive medium, and may define a flow therein. A fuel electrode 130 of the cell 100 may be supported in the cell chamber 120 so as to be contacted by the ionically conductive medium. In an embodiment, the fuel electrode 130 is a metal fuel electrode that functions as an anode when the cell 100 operates in discharge, or electricity generating, mode, as discussed in further detail below. As shown, in some embodiments the fuel electrode 130 may comprise a plurality of permeable electrode bodies 130a-130e. Although in the illustrated embodiment five permeable electrode bodies 130a-130e are used, in other embodiments any number of permeable electrode bodies is possible. Each permeable electrode body 130a-130e may include a screen that is made of any formation that is able to capture and retain, through electrodeposition, or otherwise, particles or ions of metal fuel from the ionically conductive medium that flows through or is otherwise present within the cell chamber 120. In an embodiment, electrode body 130a may be a terminal electrode body, configured such that when charging, metal fuel may generally grow on the electrode bodies 130a-e in a direction defined from electrode body 130a towards electrode body 130e. Although in the illustrated embodiment, the permeable electrode bodies 130a-130e may have different sizes so that a stepped scaffold configuration may be used, as described by U.S. patent application Ser. No. 13/167,930, and incorporated by reference above, in other embodiments the permeable electrode bodies 130a-130e may have substantially the same size.

In some embodiments, a plurality of spacers may separate the permeable electrode bodies 130a-130e so as to create flow lanes in the fuel electrode 130. Although in some embodiments the plurality of spacers may be connected to the housing 110 so that the fuel electrode 130 may be held in place relative to the housing 110, in other embodiments the spacers may be molded in between the permeable electrode bodies 130a-130e, and potentially between the fuel electrode 130 and the charging electrode 140, such that the permeable electrode bodies 130a-e (and potentially the charging electrode 140) are part of a combined electrode module. Such a configuration is depicted in U.S. patent application Ser. No. 12/901,410, published as U.S. Patent Application Publication No. 2011/0086278, incorporated by reference in its entirety above. In various embodiments, the spacers may be non-conductive and electrochemically inert so they are inactive with regard to the electrochemical reactions in the cell 100. In some embodiments, the spacers may be made from a suitable plastic material, such as polypropylene, polyethylene, polyester, noryl, ABS, fluoropolymer, epoxy, or so on. The flow lanes in the fuel electrode 130 may be three-dimensional, and have a height that is substantially equal to the height of the spacers. Although generally the spacers would be oriented vertically so as to create flow lanes that are parallel to the charging electrode generating the bubbles, in other embodiments, such as but not limited to where the top of the fuel electrode 130 is blocked, as described below, the spacers may be oriented so as to create flow lanes oriented through the permeable electrode bodies 130a-e. It should be appreciated, however, that the spacers and/or flow lanes are optional, and may be omitted in some embodiments.

In some embodiments of the cell 100, such as that illustrated, a charging electrode 140 may be positioned spaced from the fuel electrode 130, distal from the terminal electrode body 130a (i.e. proximal to the electrode body 130e). In some embodiments, the charging electrode 140 may be a portion of the fuel electrode 130 (including, for example, being one or more of the permeable electrode bodies 130b-130e). As with the fuel electrode 130, the charging electrode 140 may be positioned within the cell chamber 120, so as to be in contact with the ionically conductive medium. In the illustrated embodiment, the charging electrode 140 is in a stepped configuration similar to the permeable electrode bodies 130a-e. In other embodiments, however, the charging electrode 140 may extend at least as far as the longest of the permeable electrode bodies 130a-e, when those electrode bodies 130a-e are in a stepped scaffold configuration, or otherwise vary in size. As described in greater detail below, the charging electrode 140 may be configured to participate in the oxidation of an oxidizable oxidant species, which is present in the liquid ionically conductive medium, so as to promote the reduction of an oxidized metal fuel species and growth of the metal fuel on the fuel electrode 130 during charging of the cell 100. Accordingly, in some embodiments, the charging electrode 140 may be characterized as an oxygen evolving electrode, due to the bubbling off of oxygen gas from the charging electrode 140 during the charging of the electrochemical cell 100, as described in greater detail below.

Further shown in FIG. 1 is an oxidant reduction electrode 150, which is spaced from the fuel electrode 130 and the charging electrode 140, distal from the terminal electrode body 130a. As shown, the oxidant reduction electrode 150 may be sealed or otherwise assembled into an oxidant reduction electrode module 160 that is immersed into the ionically conductive medium in the cell chamber 120. At least one air channel 165 extends into the oxidant reduction electrode module 160, so as to provide air or any other oxidant to an air space 170 that is formed between a housing of the oxidant reduction electrode module 160 and the oxidant reduction electrode 150. It may be appreciated that the air or other oxidant in the air space 170 supplies oxidant to the oxidant reduction electrode 150. Additional details of such a configuration are described in U.S. patent application Ser. No. 13/531,962, incorporated by reference in its entirety above. As shown, in embodiments containing a separate charging electrode 140, the charging electrode 140 may be positioned between the oxidant reduction electrode 150 and the fuel electrode 130. In embodiments of the cell 100 lacking a separate charging electrode 140, the oxidant reduction electrode 150 may be utilized both during charging and discharging of the cell 100 (i.e. as an anode during charging and as a cathode during discharging).

Components of the cell 100, including for example, the fuel electrode 130, the permeable electrode bodies 130a-e thereof, the charging electrode 140, and the oxidant reduction electrode 150 may be of any suitable construction or configuration, including, for example, being constructed from one or more of Nickel or Nickel alloys (including Nickel-Cobalt, Nickel-Iron, Nickel-Copper (i.e. Monel), or superalloys), Copper or Copper alloys, brass, bronze, carbon, platinum, silver, silver-palladium, or any other suitable metal or alloy. In some embodiments, one or more components of the cell 100, such as the fuel electrode 130, the separate charging electrode 140, and the oxidant reduction electrode 150, may comprise a highly conductive material that is plated with a more degradation resistant material. For example, in some embodiments, one or more components of the cell may comprise copper that is plated with nickel. As noted above, in some embodiments, the fuel electrode 130 may be formed from permeable metal screens (i.e. the permeable electrode bodies 130a-e), which may be configured to capture, retain, and provide a growth platform for the metal fuel. Likewise, in some embodiments the separate charging electrode 140 may be of a similar configuration to one of the permeable electrode bodies 130a-e. In other embodiments, the charging electrode 140 may be of another configuration, which may be configured to create a potential difference with the fuel electrode 130 so as to encourage fuel growth on the fuel electrode during charging of the electrochemical cell 100. As discussed in greater detail below, the charging electrode 140 may be configured to evolve bubbles of gaseous oxygen during the charging process, which may rise upwards in the cell 100 due to their buoyancy in the ionically conductive medium, which may drive the convective flow of the ionically conductive medium.

Like the fuel electrode 130 and the charging electrode 140, the oxidant reduction electrode 150 may too be of any appropriate construction or configuration. For example, the oxidant reduction electrode 150 may generally be configured to support oxygen reduction in the electrochemical cell 100, to create a potential difference with the fuel electrode 130 during discharge of the cell 100. In an embodiment, the oxidant reduction electrode 150 may contain an active layer having meshes or coatings that may be characterized as "active material(s)". The active material(s) facilitate the electrochemical reactions associated with oxygen reduction. Accordingly, in an embodiment, the oxidant reduction electrode 150 is positioned in the cell housing 110 such that the active materials contact the ionically conductive medium allowing ions to be conducted to and/or from the fuel electrode 130. In some embodiments, the active materials may be formed by a mixture of catalyst particles or materials, conductive matrix and hydrophobic materials, sintered to form a composite material or otherwise layered together. In various embodiments the active materials may be constructed of one or more metals and/or their oxides, such as but not limited to manganese, silver, nickel, platinum, lanthanum, strontium, and cobalt. In some embodiments, the active materials may include a catalyst film, which in various embodiments may be formed by techniques including but not limited to thermal spray, plasma spray, electrodeposition, or any other particle coating method.

Electrically coupled to the active materials may be a current collector, which may be configured to receive electrons from a load for consumption by the oxidant reduction reaction when the cell 100 is in a discharge mode. Likewise, the current collector may be configured to collect electrons from the oxidation reaction at the active materials (i.e. if the oxidant reduction electrode 150 serves as the charging electrode) for delivery to the power supply PS, to participate in the electrochemical reactions at the active materials, when the cell 100 is in a charging mode. The current collector may be of any appropriate construction or configuration, including but not limited to being a metal screen, which may have a defined strand width, pore opening and thickness. In various embodiments the current collector may be constructed of metals or alloys such as but not limited to those described above for the active layer.

Additionally included in the oxidant reduction electrode 150 may be one or more hydrophobic materials, which may be any materials that are generally gas permeable but liquid impermeable, so as to contain the ionically conductive medium within the cell housing 110, or otherwise maintain an air space associated with the oxidant reduction electrode 150 (i.e. in the oxidant reduction electrode module 160). Although hydrophobic may in some contexts be understood as "water phobic" it should be appreciated that as used herein, hydrophobic implies impermeability to the ionically conductive medium as a whole, and is not necessarily just impermeable to the water in the ionically conductive medium. As such, the hydrophobic materials may also be considered hygrophobic, or "liquid phobic," materials. The oxidant reduction electrode 150 as a whole may therefore be liquid impermeable, yet permeable to a gaseous oxidant, such that the gaseous oxidant may contact the active materials of the oxidant reduction electrode 150, so as to serve as the oxidant during the electrochemical reactions taking place during discharge of the cell 100. In various embodiments, the hydrophobic materials may be of any suitable construction or configuration that facilitates supporting the active materials thereon, be generally permeable to the gaseous oxidant, and be generally impermeable to the ionically conductive medium.

In some embodiments, the hydrophobic material or materials serve as a backing material for the active materials and/or the current collector. Although the hydrophobic materials may vary across embodiments, in some embodiments the hydrophobic materials may be constructed of or otherwise include a fluoropolymer. As an example, in various embodiments, the hydrophobic materials may comprise polytetrafluoroethylene (also known as PTFE, or Teflon®), which may in some embodiments be thermo-mechanically expanded (also known as ePTFE, or Gore-Tex®). In other embodiments, the hydrophobic materials may comprise Fluorinated Ethylene Propylene (also known as FEP), or any other fluoropolymer. In some embodiments, the hydrophobic materials may have a fine pore size, such as but not limited to one on the order of less than 1 micrometer, or in more particular examples, may be on the order of approximately 50 to 200 nanometers. It may be appreciated that in some embodiments the hydrophobic materials may have limited tensile strength through the thickness of the oxidant reduction electrode 150. Accordingly, in some embodiments the hydrophobic materials may be reinforced by an oxidant-permeable reinforcing layer, such as that disclosed in U.S. Provisional Patent Application 61/556,011, incorporated in its entirety above by reference.

The fuel used in the cell 100 may be a metal, such as iron, zinc, aluminum, magnesium, or lithium. By metal, this term is meant to encompass all elements regarded as metals on the periodic table, including but not limited to alkali metals, alkaline earth metals, lanthanides, actinides, and transition metals, either in atomic, molecular (including metal hydrides), or alloy form when collected on the electrode body. However, the present invention is not intended to be limited to any specific fuel, and others may be used. The fuel may be provided to the cell 100 as particles suspended in the ionically conductive medium.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, or lithium chloride. In some embodiments, the ionically conductive medium is aqueous potassium hydroxide. In an embodiment, the ionically conductive medium may comprise an electrolyte. For example, a conventional liquid electrolyte solution may be used, or a room temperature ionic liquid may be used, as mentioned in U.S. patent application Ser. Nos. 12/776,962 and 13/526,432, previously incorporated by reference above. In some embodiments, additives may be added to the ionically conductive medium, including but not limited to additives that enhance the electrodeposition process of the metal fuel on the fuel electrode 130, such as is described in U.S. patent application Ser. No. 13/028,496, previously incorporated by reference above. Such additives may reduce the loose dendritic growth of fuel particles, and thus the likelihood of such fuel particles separating from the fuel electrode 130, for example.

In operation of the cell 100, the fuel may be oxidized at the fuel electrode 130 when the fuel electrode 130 is operating as an anode, and an oxidizer, such as oxygen, $Cl_2$, or any other appropriate oxidizer, may be reduced at the oxidant reduction electrode 150 when the oxidant reduction electrode 150 is operating as a cathode, which is when the cell 100 is connected to a load and the cell 100 is in discharge or electricity generation mode, as discussed in further detail below. The reactions that occur during discharge mode may generate by-product precipitates, e.g., a reducible fuel species, in the ionically conductive medium. For example, in embodiments where the fuel is zinc, zinc oxide may be generated as a by-product precipitate/reducible fuel species. The oxidized zinc or other metal may also be supported by, oxidized with or solvated in the electrolyte solution, without forming a precipitate (e.g. zincate may be a dissolved reducible fuel species remaining in the fuel). During a recharge mode, which is discussed in further detail below, the reducible fuel species, e.g., zinc oxide or zincate ions, may be reversibly reduced and deposited as the fuel, e.g., zinc, onto at least a portion of the fuel electrode 130 that functions as a cathode. At the same time, either the oxidant reduction electrode 150 or the separate charging electrode 140, and/or another portion of the fuel electrode 130 functions as the anode, and oxidizes an oxidizable oxygen species (e.g., $OH^-$ ions) in the ionically conductive medium to evolve gaseous oxygen. In an embodiment, the oxidizable oxygen species may be the reduced oxidant species that was created in the cell 100 during a discharge thereof.

Although in some embodiments the oxidizer may be delivered to the oxidant reduction electrode 150 by a passive system, which may be sufficient to allow diffusion or permeation of, e.g. oxygen from the air, into the oxidant reduction electrode 150, in other embodiments different sources of the oxidizer or mechanisms for bringing the oxidizer to the oxidant reduction electrode may be utilized. For example, in an embodiment, a pump such as an air pump AP may be used to deliver the oxidizer to the oxidant reduction electrode 150 under pressure. The air pump AP may be of any suitable construction or configuration, including but not limited to being a fan or other air movement device configured to produce a constant or pulsed flow of air or other oxidant. The oxidizer source may be a contained source of oxidizer. In an embodiment, oxygen may be recycled from the electrochemical cell module 100, such as is disclosed in U.S. patent application Ser. No. 12/549,617, previously incorporated by reference above. Likewise, when the oxidizer is oxygen from ambient air, the oxidizer source may be broadly regarded as the delivery mechanism, whether it is passive or active (e.g., pumps, blowers, etc.), by which the air is permitted to flow to the oxidant reduction electrode 150. Thus, the term "oxidizer source" is intended to encompass both contained oxidizers and/or arrangements for passively or actively delivering oxygen from ambient air to the oxidant reduction electrode 150.

In various embodiments, the permeable electrode bodies 130a-e, the separate charging electrode 140, and the oxidant reduction electrode 150 may be connected by a switching system that may be configured to connect the cell 100 to a power supply PS, a load, or other cells 100 in series. During discharge, the fuel electrode 130 is connected to the load, and operates as an anode so that electrons given off by the metal fuel, as the fuel is oxidized at the fuel electrode 130, flows to the external load. The oxidant reduction electrode 150 functions as the cathode during discharge, and is configured to receive electrons from the external load and reduce an oxidizer that contacts the oxidant reduction electrode 150, specifically oxygen in the air surrounding the cell 100, oxygen being fed into the cell 100, or oxygen recycled from the cell 100.

The operation of the switching system may vary across embodiments, and in some embodiments the operation may be similar to those described in U.S. patent application Ser. No. 13/299,167, incorporated above by reference. As another example, in an embodiment, the external load may be coupled to some of the permeable electrode bodies 130a-130e in parallel, as described in detail in U.S. patent application Ser. No. 12/385,489, incorporated above by reference. In other embodiments, the external load may only be coupled to the terminal permeable electrode body 130a, distal from the oxidant reduction electrode 150, so that fuel consumption may occur in series from between each of the permeable electrode bodies 130a-130e. In some embodiments, the cell 100 may be configured for charge/discharge mode switching, as is described in U.S. patent application Ser. No. 12/885,268, filed on Sep. 17, 2010, previously incorporated by reference above.

In some embodiments, one or more of the electrode bodies 130a-e, the oxidant reduction electrode 150 and/or the charging electrode 140 may be interconnected by the switching system, or any other circuit, so as to selectively facilitate control of the charging and discharging of the cell 100. Switches associated with the switching system may be controlled by a controller, which may be of any suitable construction and configuration, including but not limited to, in some embodiments, conforming generally to those disclosed in U.S. application Ser. Nos. 13/083,929, 13/230,549, and 13/299,167, incorporated by reference above. In various embodiments, the control of the switches of the switching system may be determined based on a user selection, a sensor reading, or by any other input. In some embodiments, the controller may also function to manage connectivity between the load and the power source PS and a plurality of the cells 100. In some embodiments, the controller may include appropriate logic or circuitry for actuating bypass switches associated with each cell 100 in response to detecting a voltage reaching a predetermined threshold (such as drop below a predetermined threshold).

Although in the illustrated embodiment of FIG. 1 the cell housing is configured such that the oxidant reduction electrode 150 is immersed with the oxidant reduction electrode module 160 into the cell chamber 120, it may be appreciated that in various embodiments, other configurations or arrangements of the cell 100 are also possible. For example, in FIG. 2, another embodiment of the cell 100 (specifically, cell 100*) is presented, whereby an oxidant reduction electrode 150* defines a boundary wall for the cell chamber 120, and is sealed to a portion of a housing 110* so as to prevent seepage of ionically conductive medium therebetween. Such a configuration is generally not preferred, however, due to concerns that a failure of the oxidant reduction electrode 150* would result in leakage of the ionically conductive medium out of the cell 100*. Regardless, in some such embodiments the convective flow of the ionically conductive medium in the cell chamber 120, described in greater detail below, may be in a direction upwards and away from the oxidant reduction electrode 150*, across the top of the fuel electrode 130.

As indicated above, during operation of the cell 100 (or cell 100*, or variations thereof), oxygen bubbles may form at an oxygen evolving electrode during charging. In the illustrated embodiment of FIG. 1, for example, the oxygen evolving electrode is the charging electrode 140, but in some embodiments it may be a portion of the fuel electrode 130 and/or the oxidant reduction electrode 150. Thus, any reference herein to an oxygen evolving electrode applies to any of these embodiments, and reference to the charging electrode 140 in the illustrated embodiments may similarly apply to all of these types of oxygen evolving electrodes. It may be appreciated that the buoyancy of the oxygen bubbles that are generated on the surface of the charging electrode 140 during charging may be utilized to circulate the ionically conductive medium of the cell 100. As described in greater detail below, while the bubbles themselves create a lift force, if the bubble sizes are of a small enough size, they may drag a substantial amount of the ionically conductive medium with them to begin flowing the ionically conductive medium in the cell 100. It may be appreciated that the flow of ionically conductive medium may also be assisted by other flow generating mechanisms beyond the bubbles generated at the charging electrode 140, including but not limited to additional gas bubblers, as described in greater detail below.

In some embodiments the housing 110 may therefore include therein flow diverters, including but not limited to blocking walls, baffles, and/or perforated channels, which may be utilized to control the magnitude and the direction of the flow of ionically conductive medium created by the buoyant lifting force of the bubbles, and create convection in the cell 100. In some embodiments, the flow diverters may be integrally molded into the cell housing 110, or may be entirely defined by the shape of the cell housing 110, such as by the internal surfaces of its walls. In other embodiments, the flow diverters may be separate bodies that are installed or otherwise joined into the housing 110. In an embodiment, portions of the fuel electrode 130, charging electrode 140, and/or oxidant reduction electrode 150, or bodies associated therewith, may be shaped or otherwise positioned to serve as a flow diverter. Schematically shown in FIG. 3 is an embodiment of an electrochemical cell 100a configured for generating a convective current (indicated generally by the thick arrows). As shown, the electrochemical cell 100a has the fuel electrode 130, the charging electrode 140, and the oxidant reduction electrode 150. It may be appreciated that in the illustrated embodiment, the oxidant reduction electrode 150 is configured as immersed into the cell chamber 120 of the electrochemical cell 100a, and has associated therewith the oxidant reduction electrode module 160 with the air space 170 (omitted in the illustrated embodiment so as to emphasize the flow of the ionically conductive medium).

Figure 4:
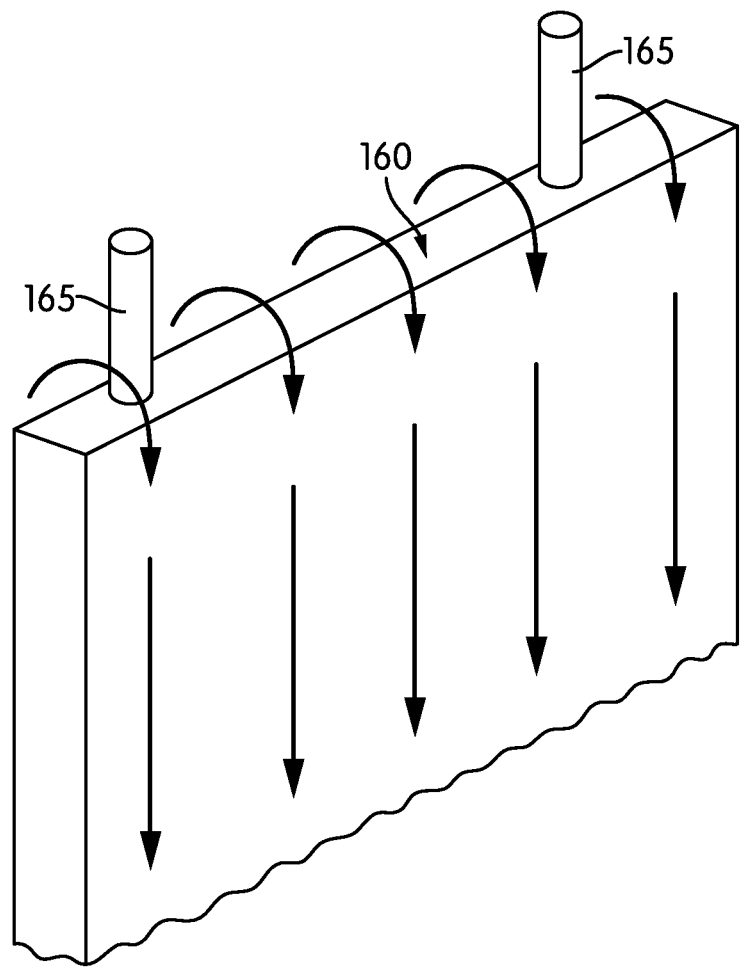
FIG. 4 depicts a perspective view of the immersed oxidant reduction electrode, depicting flow of ionically conductive medium around air channels thereof.

In the illustrated embodiment of FIG. 3, oxygen bubbles generated at the oxygen evolving charging electrode 140 rise upward, due to their buoyancy, to a top 180 of the housing 110a. Although bodies such as the fuel electrode 130, the charging electrode 140, and the oxidant reduction electrode 150 may affect the direction and rate, it may be appreciated that the flow diverters may also guide and direct the flow of ionically conductive medium created by the movement of the bubbles. This movement will generally be constrained around the charging electrode 140, between the fuel electrode 130 and the oxidant reduction electrode 150. In an embodiment, such as that of cell 100a, an area directly vertically above the charging electrode 140 and the fuel electrode 130 may be relatively unblocked to the flow of the oxygen bubbles upwards, towards the top 180. As shown, in some embodiments, the movement of the oxygen bubbles may be bounded initially by the fuel electrode 130 and the oxidant reduction electrode 150. As the oxygen bubbles flow past the fuel electrode 130 and the oxidant reduction electrode 150, however, they may subsequently be permitted to flow outwards to a side 190 of the housing 110a, over the immersed oxidant reduction electrode 150 (and the oxidant reduction electrode module 160, not shown in FIG. 3). As may be appreciated from FIG. 4, the air channels 165 that allow the flow of air into the air space 170 are configured to not completely block the ionically conductive medium, so that the flow of ionically conductive medium, and the bubbles initially entrained therein, may generally pass around and/or between the air channels 165, and may flow down the back of the oxidant reduction electrode module 160, as generally illustrated by the depicted arrows.

In the embodiment of cell 100a, a blocking wall 200 is provided to prevent the bubbles from expanding both towards and away from the side 190. Once the bubbles clear the oxidant reduction electrode 150, the charging electrode 140 and/or the fuel electrode 130, the blocking wall 200 may extend towards the top 180 so that the ionically conductive medium is directed into an off-gassing area 210 of the cell chamber 120. As shown, the off-gassing area 210 may be an area of the cell housing 110a that is bounded by the side 190 and a convection baffle 220, which has an elongated portion 230 that extends in the cell chamber 120 generally parallel to the flow of the bubbles upward from the charging electrode 140, and directs the ionically conductive medium from the top 180 towards a bottom 240 of the cell housing 110a. The off-gassing area 210 may also be referred to as an off-gassing column because of its vertical orientation. In some embodiments, the convection baffle 220 may be formed at least partially from a portion of the oxidant reduction electrode module 160 immersed in the ionically conductive medium. It may be appreciated that the off-gassing area 210 is generally separated from the electrodes of the cell 100, so that bubbles entrained in the flow of ionically conductive medium may coalesce together and/or separate from the flow of ionically conductive medium therethrough, such that the bubbles in the off-gassing area 210 rise towards the top 180, while the flow of ionically conductive medium continues flowing through the off-gassing area 210. In particular, as the ionically conductive medium is deflected over the off-gassing area 210, away from where more oxygen bubbles are rising from the charging electrode 140, the less buoyant ionically conductive medium is free to separate from the bubbles, and begins to fall towards the bottom 230 of the cell housing 110a. Additionally, as described in greater detail below, bubbles generate less viscous drag with greater volume (i.e. bubble size). Thus, because the bubbles are smaller when they are first generated, they drag more fluid with them than the larger bubbles in the off-gassing area 210, which are formed by the coalescing of the smaller bubbles. This difference in bubble size, and subsequent difference in fluid drag, may be understood as creating the direction of fluid motion that creates the convective flow of the ionically conductive medium. Furthermore, it may be appreciated that any particulates or other materials entrained in the flow of ionically conductive medium may also separate from the flow in the off-gassing area 210, and depending on the buoyancy of the particulates, may either settle at the bottom of the off-gassing area 210, or may float at the top of the off-gassing area 210.

As shown, the convection baffle 220 may have a bottom portion 250 that directs the downwardly flowing ionically conductive medium across the bottom 240 to an opposing side of the fuel electrode 130 from the charging electrode 140 which is proximal to permeable electrode body 130a, and is near a side 260 of the cell housing 110a that is distal from the side 190. In some embodiments, this area of the cell chamber 120 may be characterized as a pre-electrode area 265, as illustrated. The convective cycle may therefore be completed by the ionically conductive medium passing through the permeable electrode bodies 130a-e, before being lifted again by the oxygen bubbles rising from the charging electrode 140. Because the oxygen bubble lift raises the liquid ionically conductive medium in the region alongside the charging electrode 140 (or other oxygen evolving electrode), it also creates a negative pressure drop or differential between that region and the pre-electrode area 265, which assists the flow of ionically conductive medium through the fuel electrode 130. Similarly, flow in the direction from off-gassing area 210 to pre-electrode area 265 under portion 250 is also encouraged by the positive downward pressure applied from the liquid in the off-gassing area 210, as well as the negative pressure on the pre-electrode area 265 by the bubble-lifted flow Such flow of ionically conductive medium through the permeable electrode bodies 130a-e may have a number of benefits, including but not limited to dislodging bubbles of oxygen or hydrogen that may otherwise adhere to the permeable electrode bodies, which among other things could interfere with fuel growth on the fuel electrode 130 during charging of the cell 100a. Hydrogen evolution (via reduction of $H^+$ to $H_2$) at the fuel electrode 130 is problematic not only because it draws parasitic current that could be used for metal reduction and plating, but its presence of bubbles can occupy space where fuel growth could be taking place, and the bubbles themselves can interfere with the metal growth and reduce its density. Thus, forcibly driving the flow through the body or bodies of the fuel electrode 130 can beneficially reduce these issues.

As further shown in FIG. 3, in some embodiments a second blocking wall 267 may extend between the side 260 and the fuel electrode 130, and may be configured to prevent the ionically conductive medium from deviating from the convective cycle, by preventing ionically conductive medium from being higher than the fuel electrode 130 in the portion of the convection cycle in the pre-electrode area 265. In other embodiments, other blocking walls or baffles may be utilized to direct the flow of the ionically conductive medium through the fuel electrode 130, so as to maintain the convective circuit. Thus, the convective circuit forces the flow to pass up over the oxidant reduction electrode 150, down through the off-gassing area 210, into the pre-electrode area 265, and through the fuel electrode 130

Figure 5:
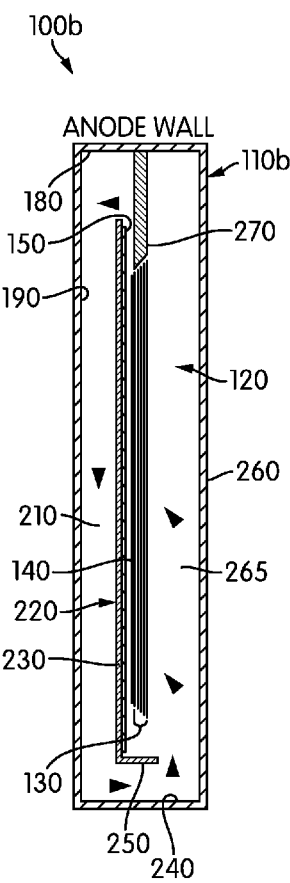
FIG. 5 depicts a schematic view of an electrochemical cell of the configuration of FIG. 1, configured for convective flow of ionically conductive medium therein, according to another embodiment.

Shown in FIG. 5 is another embodiment of the electrochemical cell 100 (specifically, an electrochemical cell 100b). As shown, the electrochemical cell 100b has an associated housing 110b that is configured to form a convective cycle of the ionically conductive medium therein. It may be appreciated that the housing 110b may be generally similar to the housing 110b, such as, for example, containing therein the off-gassing area 210 formed by the elongated portion 230 of the convection baffle 220, and the side 190 of the housing 110b. Additionally the convection baffle 220 again contains the bottom portion 250 that, along with the bottom 240 of the cell housing 110b, guides the flow of ionically conductive medium into the pre-electrode area 265, and from there into a side of the fuel electrode 130 opposite from the charging electrode 140. Unlike the cell 100a, however, cell 100b has an anode wall 270 configured to prevent the convective flow of ionically conductive medium from being lifted with the bubbles from the charging electrode 140 without passing at least partially through each of the permeable electrode bodies 130a-e of the fuel electrode 130. It may be appreciated that in some such embodiments, the bubbles may be constrained to a narrower aperture as they rise from the charging electrode 140 towards the top 180 of the housing 110b, which may affect the convective flow rate of the ionically conductive medium. As shown, in some embodiments, such as that illustrated, where the fuel electrode 130 has a stepped scaffold configuration, the anode wall 270 may be angled or otherwise shaped to match the stepped shape of the fuel electrode 130. Although in some embodiments the ionically conductive medium may be blocked from rising above the height of the fuel electrode 130 on its pre-electrode area 265 side, as was the case in the cell 100a, in some embodiments, such as the embodiment of cell 100b, such a constriction might not be implemented.

Figure 6:
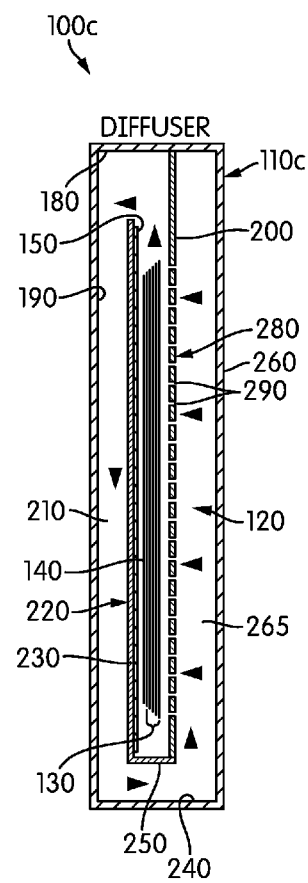
FIG. 6 depicts a schematic view of an electrochemical cell of the configuration of FIG. 1, configured for convective flow of ionically conductive medium therein, according to another embodiment.

FIG. 6 depicts another embodiment of the cell 100 (denoted as a cell 100c). The electrochemical cell 100c has an associated housing 110c that again forms a convective cycle of the ionically conductive medium therein. As above, the housing 110c may be generally similar to the housing 110a or the housing 110b. For example, the housing 110c contains therein the off-gassing area 210 formed by the elongated portion 230 of the convection baffle 220, and the side 190 of the housing 110c. The convection baffle 220 again contains the bottom portion 250 that, along with the bottom 240 of the cell housing 110c, guides the flow of ionically conductive medium into the pre-electrode area 265, from where it can be drawn at least partially through the fuel electrode 130. In some embodiments, one or more regions of the cell 100, such as the bottom portion 250 and/or the bottom 240 of the cell housing 110, may include or have associated therewith a catch tray electrode configured to oxidize dendritic particles of fuel that have separated from the fuel electrode 130, as described in U.S. patent application Ser. No. 13/185,658, incorporated by reference in its entirety above. As with the cell 100a, a blocking wall 200 generally prevents the bubbles rising from the charging electrode 140 and the ionically conductive medium flowing with them from diverting outwards towards the side 260 of the housing 110c. Instead, the blocking wall 200, potentially in combination with the top wall 180, directs the bubbles, and the flow of ionically conductive medium, towards the side 190 and the off-gassing area 210. Unlike the prior cells 110a and 110b, however the cell 110c includes therein a diffuser 280 that is configured to direct the flow of ionically conductive medium proximal to the side 260 of the cell housing 110c generally perpendicularly into the fuel electrode 130 (i.e. at a right angle to the fuel electrode 130 itself), as opposed to the generally angled flow of the embodiments above. It may be appreciated that the diffuser 280 may vary across embodiments, and as such may have any number of apertures 290 therein that are oriented between the side 260 and the fuel electrode 130. It may also be appreciated that in some embodiments the diffuser 280 may be configured to establish a particular angle or multiple particular angles of flow onto the fuel electrode 130, such as by varying the angle of one or more of the apertures 290. As above, while in some embodiments the ionically conductive medium may be blocked from rising above the height of the fuel electrode 130, in other embodiments, such as the illustrated embodiment of cell 100c, such a constriction might not be implemented.

Figure 7:
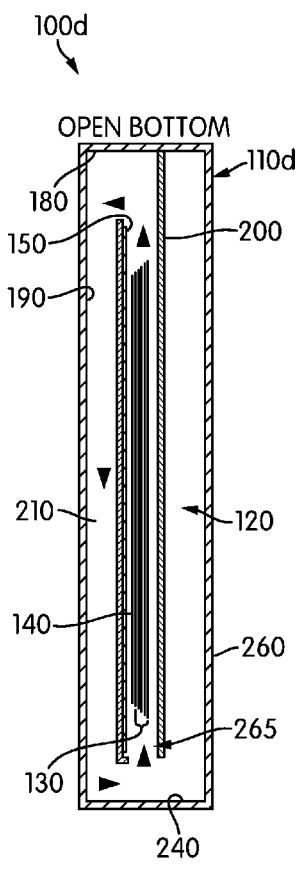
FIG. 7 depicts a schematic view of an electrochemical cell of the configuration of FIG. 1, configured for convective flow of ionically conductive medium therein, according to another embodiment.

FIG. 7 shows another embodiment of the cell 100 (namely, cell 100d), containing an associated housing 110d configured for convective cycling of the ionically conductive medium. As shown, the housing 110d is generally configured such that the convective cycle of the ionically conductive medium passes upwards through the length of the fuel electrode 130. For example, in the illustrated embodiment, the ionically conductive medium is configured to flow vertically generally parallel to and between the permeable electrode bodies 130a-e, instead of being oriented into and through each of the permeable electrode bodies 130a-e as in the previous embodiments. As shown, in an embodiment the blocking wall 200 may generally extend from the top 180 towards the bottom 240, and may be generally parallel to the orientation of the electrodes of the cell 100d. Although in some embodiments the blocking wall 200 may extend as far as the bottom 240, and may replace or otherwise be the side 260, in other embodiments the blocking wall 200 may be spaced from the side 260, such that a supply of ionically conductive medium remains in the space therebetween. As shown in the illustrated embodiment, so that the convective flow of the ionically conductive medium passes along the permeable electrode bodies 130a-e, the convection baffle 220 may lack the bottom portion 250 found in the prior embodiments. In other embodiments, the convection baffle 220 may contain the bottom portion 250, however the bottom portion 250 may contain one or more apertures therein so as to receive the convective flow.

Figure 8:
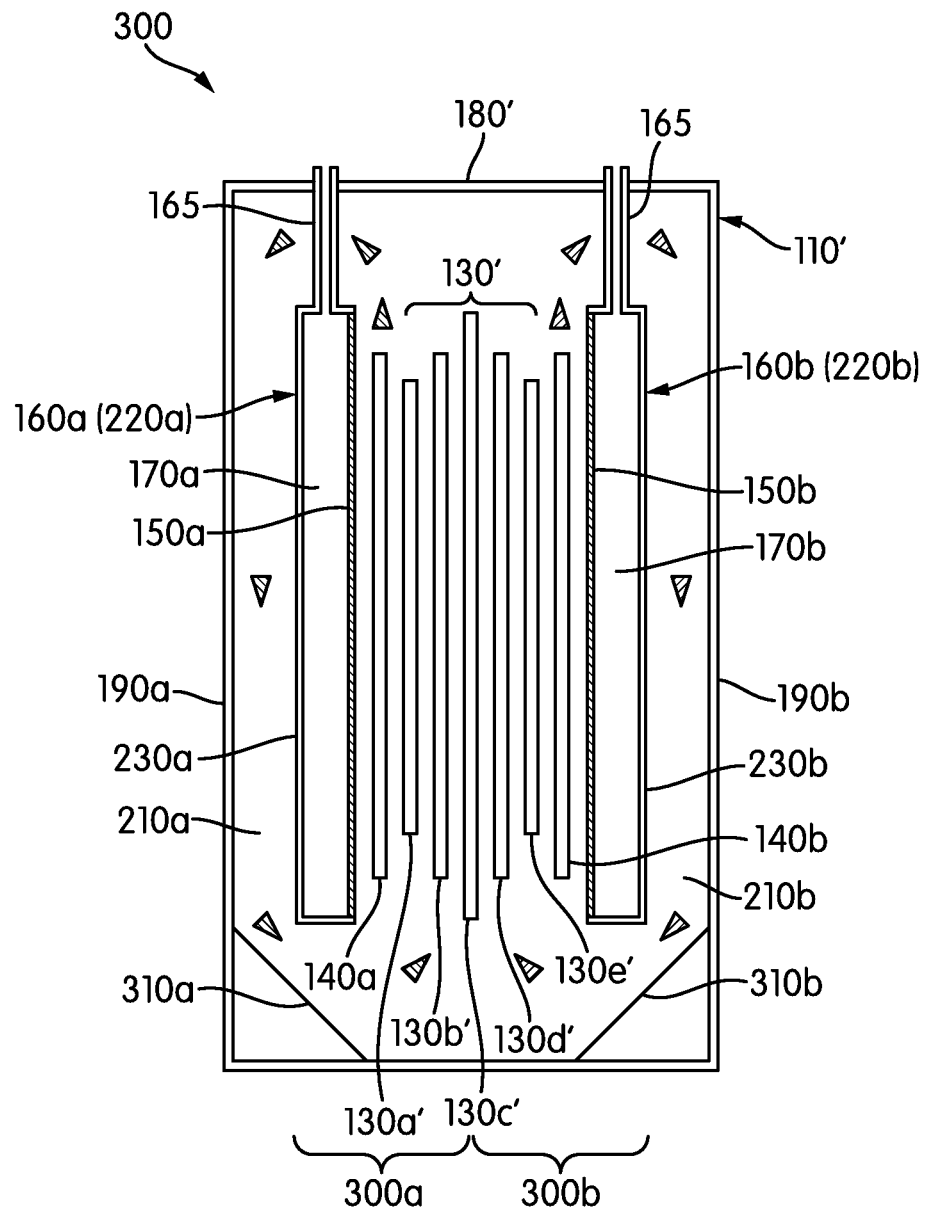
FIG. 8 depicts a schematic view of an bicell having the configuration of FIG. 1, wherein two cells are immersed in a common housing.

As depicted in FIG. 8, it may be appreciated that in some embodiments multiple cells may be installed together in a common housing 110'. Such an assembly may facilitate desired flow directions based on the interaction of bubbles generated from each cell, and may also reduce production costs, by reducing the number of discrete parts therein. The assembly of FIG. 8 contains two cells therein, and thus may be referred to as bicell 300. It may be appreciated that the two cells (individually cell 300a and 300b) define bicell 300, additional cells may also be included in other embodiments (i.e. forming a tricell, a quadcell, or so on). Although in some embodiments each cell 300a and 300b may contain its own associated fuel electrode 130 (i.e. spaced from one another), in other embodiments, such as that shown, bicell 300 contains a common fuel electrode 130' for both cells 300a and 300b. In particular, common fuel electrode 130' is shared by a pair of oxidant reduction electrodes 150a and 150b, associated with cells 300a and 300b respectively. As shown, the illustrated common fuel electrode 130' contains therein a plurality of permeable electrode bodies 130a'-130e' in a stepped scaffold configuration, whereby electrode body 130c' is positioned in the center, and may be associated with either cell 300a or cell 300b. It may be appreciated, then, that permeable electrode bodies 130a' and 130b' may be generally considered to be associated with cell 300a, while permeable electrode bodies 130d' and 130e' may be generally considered to be associated with cell 300b. In some embodiments, however, the entirety of the common fuel electrode 130' may be understood as participating in electrochemical reactions with both oxidant reduction electrode 150a and oxidant reduction electrode 150b.

Associated with each cell 300a and 300b in the illustrated embodiment are charging electrodes 140a and 140b. Although in the illustrated embodiment charging electrodes 140a and 140b are spaced from the common fuel electrode 130', it may be appreciated that in some embodiments the charging electrodes 140a and 140b may comprise a portion of the common fuel electrode 130', as described above. As shown, the dedicated charging electrodes 140a and 140b may generally be positioned between the common fuel electrode 130' and the oxidant reduction electrodes 150a and 150b. As may be appreciated from the embodiments above, the bubbles formed during charging rise from where they are evolved on the charging electrodes 140a and 140b to the top of the housing 110', and develop a flow of the ionically conductive medium. It may be appreciated that the spaced arrangement of the charging electrodes 140a and 140b will generally drive the bubbles, and thus the flow, away from one another, over the opposing oxidant reduction electrode modules 160a and 160b that are associated with each oxidant reduction electrode 150a and 150b. Specifically, as the bubbles rise to the top 180' of the housing 110' from each of the charging electrodes 140a and 140b, sufficient bubbles may gather near the top 180' such that there path of least resistance for additional bubbles and flow to travel to is over the top of each of the oxidant reduction electrode modules 160a and 160b.

As shown, two separate flow portions may subsequently occur, between the oxidant reduction electrode module 160a and a side 190a of the housing 110' that is proximal to the oxidant reduction electrode module 160a, and between the oxidant reduction electrode module 160b and a side 190b of the housing 110' that is proximal to the oxidant reduction electrode module 160b. Similar to embodiments above, these regions between the oxidant reduction electrode modules 160a-b and the sides 190a-b may be characterized as associated off-gassing regions 210a and 210b, whereby the bubbles may separate from the ionically conductive medium, rising back to the top 180', while the denser ionically conductive medium continues downward within the flow. It may therefore be appreciated that in some cases additional sets of generated bubbles from separate charging electrodes (i.e. charging electrodes 140a and 140b), may be considered flow diverters.

As indicated above, in some embodiments the convection baffle 220 may comprise at least a portion of the oxidant reduction electrode module 160. Such an implementation is depicted in the illustrated embodiment, where convection baffle 220a is formed with oxidant reduction electrode module 160a, while convection baffle 220b is formed with oxidant reduction electrode module 160b. As such, the back walls (distal from the oxidant reduction electrodes 150a and 150b) of the oxidant reduction electrode modules 160a and 160b therefore form the elongated portions 230 (specifically elongated portion 230a and elongated portion 230b). Accordingly, in the illustrated embodiment off-gassing region 210a is formed between side 190a and elongated portion 230a of oxidant reduction electrode module 160a, while off-gassing region 210b is formed between side 190b and elongated portion 230b of oxidant reduction electrode module 160b. As indicated above, in some embodiments additional flow diverters may also be present. Shown in the illustrated embodiment, for example, are additional flow diverters 310a and 310b, which are configured to angle the flow of ionically conductive medium at the bottom of the off-gassing regions 210a and 210b, so that the flow from each side is directed generally towards the center of the bicell 300. It may therefore be appreciated that the flow may be generally directed towards the center of the common fuel electrode 130', or to the respective fuel electrodes of each of the cells 300a and 300b of the bicell 300.

Although not illustrated in FIG. 8, in some embodiments additional flow diverters or other flow modifying bodies, such as those described in the embodiments above, may be implemented in bicell 300. For example, in some embodiments a bottom portion similar to bottom portion 250 described above may be implemented as associated with each of oxidant reduction electrode modules 160a and 160b. Such a bottom portion may prevent the convective flows from cycling directly around the oxidant reduction electrodes 160a and 160b (i.e. starting with the bubbles generated by the charging electrodes 140a and 140b, around the oxidant reduction electrodes 160a and 160b, and returning back to the charging electrodes 140a and 140b), without at least partially being directed into the common fuel electrode 130'. It may be appreciated that the convective flows will draw ionically conductive medium through the common fuel electrode 130' regardless, by dragging the ionically conductive medium adjacent to the bubble formation at the charging electrodes 140a and 140b, however such bottom portions may in some embodiments increase movement of the ionically conductive medium through the common fuel electrode 130'.

Likewise, in some embodiments a diffuser similar to diffuser 280 may be installed in bicell 300. It may be appreciated that the diffuser may generally be installed underneath common fuel electrode 130', and may align the flows of ionically conductive medium to flow in any desired direction or directions with respect to the common fuel electrode 130'. Additionally, in some embodiments walls or other flow directing bodies, similar to anode wall 270, for example, may be installed generally above common fuel electrode 130', so as to direct the convective flows of ionically conductive medium and the flow of the bubbles generating the flow, after the bubbles rise above the charging electrodes 140a and 140b. It may be appreciated in the embodiment of bicell 300, in the embodiments described above, and in other such embodiments, the various blocking walls and/or other flow diverting bodies may be coupled to the housings (such as housing 110'), the oxidant reduction electrode modules 160a-b, the common fuel electrode 130' (or other fuel electrodes 130), or so on.

Figure 9:
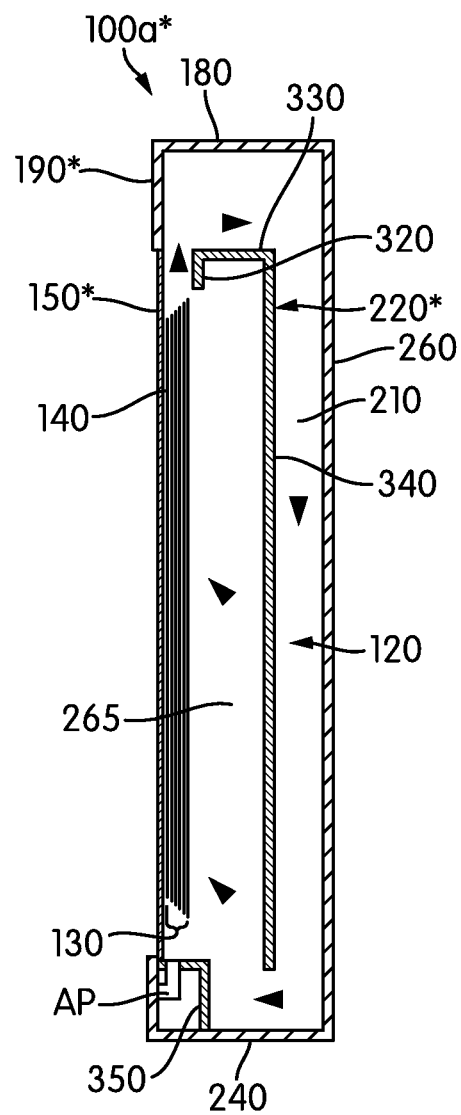
FIG. 9 depicts a schematic view of an electrochemical cell of the configuration of FIG. 2, configured for convective flow of ionically conductive medium therein, according to an embodiment.

It may be appreciated that other configurations of the cell 100 that create a convective flow of the ionically conductive medium constrained to pass through the fuel electrode 130 are also possible. For example, various embodiments of the cell 100*, having the oxidant reduction electrode 150* forming a boundary wall of the housing 110*, may also be configured to generate convective flow. For example, shown in FIG. 9, is a cell 100a* having a housing 110a*. The housing 110a* includes the top 180, the bottom 240, and the side 260, similar to the embodiments of the cells 100a-d described above. As shown, a side 190* is also present, similar to the side 190, however configured to receive therein the oxidant reduction electrode 150*, so that the oxidant reduction electrode 150* may absorb oxygen from the air surrounding the cell 100a*. Furthermore the off-gassing area 210 is additionally present, however relocated from the above variations of the cell 100, as the ionically conductive medium would not flow over the oxidant reduction electrode 150* as it would in the immersed oxidant reduction electrode 150 of the above embodiments.

As shown in the illustrated embodiment, the cell 100a* is configured such that oxygen bubbles evolved at the charging electrode 140 rise upward towards the top 180, whereby the side 190 above the oxidant reduction electrode 150* deflects the oxygenated flow towards the side 260. A convection baffle 220* is shown to further bound the convective flow. For example, in some embodiments, the convection baffle 220* includes a blocking wall 320 that generally extends from near the fuel electrode 130, such that the bubbles are prevented from flowing back towards the fuel electrode 130. A top portion 330 of the convection baffle 220* may be provided to cooperate with the top 180 to redirect the oxygenated ionically conductive medium away from the fuel electrode 130, towards the off-gassing area 210, which in the illustrated embodiment is bounded between the side 260 of the housing 110a*, and an elongated portion 340 of the convection baffle 220*. As in the above embodiments, the ionically conductive medium is permitted to separate away from the bubbles in the off-gassing area 210, falling towards the bottom 240 of the housing 110a*. As further shown, once reaching the bottom 240, the ionically conductive medium may then be directed through the fuel electrode 130, completing the convection cycle. In the illustrated embodiment, a blocking wall 350 is further provided to direct the flow of ionically conductive medium along the bottom 240 upward towards the terminal electrode body 130a, whereby it may pass through the permeable electrode bodies 130a-130e to complete the convection cycle. In other embodiments other blocking walls may be utilized in addition to or alternatively from those of cell 100a*, so as to redirect the flow across each of the permeable electrode bodies 130a-e, similar to the embodiment of the cell 100d. In some embodiments a diffuser may be provided to angle the flow of ionically conductive medium into the fuel electrode 130, similar to the embodiment of the cell 100c. In some embodiments, an anode wall may be utilized to restrict the flow at the fuel electrode 130, and narrow the channel for the oxygen bubbles emitted from the charging electrode 140.

It may be appreciated that in various embodiments the oxygenated ionically conductive medium may have a tendency to rise upward and expand or "bloom" outwardly based solely on the buoyancy of the bubbles and the constrictions placed upon them by the various walls, blocking members, and baffles of cells 100. Accordingly, the top 180 of the various housings 110 may be of any suitable construction or configuration, and may in some embodiments be omitted entirely (i.e. such that the ionically conductive medium is exposed). Such embodiments might not be preferred, however, as fully containing the ionically conductive medium within the cell 100 may prevent spillage of the ionically conductive medium when the cell 100 is moved, or prevent entry of contaminants into the cell 100. In other embodiments, a gas vent may be provided in the cell 100, such as but not limited to that disclosed in U.S. patent application Ser. No. 13/566,948, which may receive the gaseous oxygen near or at the top 180 of the cell chamber 120. In some embodiments, the gas vent may be a gas permeable liquid impermeable membrane, configured to prevent loss of the ionically conductive medium therethrough, but allow the oxygen from the bubbles to escape from the cell. Where the gas vent is liquid impermeable, in some embodiments the gas vent may be located at least partially contacting the ionically conductive medium. In some embodiments, areas above the level of the ionically conductive medium near or at the top 180 may be perforated or otherwise configured such that the gas may exit from the cell 100.

Although generally the charging electrode 140, or other oxygen evolving electrodes in the cell 100, drive the convective cycle by generating gaseous oxygen during charging of the cell 100, it may be appreciated that in some embodiments it may be desirable for the ionically conductive medium to flow within the cell when the cell is in a discharge mode, or when the cell is idle. In some such embodiments, including but not limited to the cell 100a* illustrated in FIG. 9, the cell 100 may contain therein a gas bubbler, including but not limited to an air pump AP, configured to bubble gas through the cell 100. Gas bubblers are also referred to as spargers. Although the air pump AP may be the same as that utilized to deliver the oxidant to the oxidant reduction electrode 150 in some embodiments, in other embodiments the air pump AP may be separate from that utilized to deliver oxidant to the oxidant reduction electrode 150. Although the gas may be air from surrounding the cell, in various embodiments other gasses or combinations of gasses may be bubbled through the cell, from any appropriate gas source. The bubbles generated by the air pump AP may be of any suitable size or shape so as to move the ionically conductive medium, including in some embodiments being generally similar to the air-bubbles evolved at the charging electrode 140 during charging of the cell. In some embodiments, the air pump AP may be coupled to one or more microtubes, so as to create bubbles of a sufficiently small size to drag the ionically conductive medium. In other embodiments, the air pump AP may be of any other suitable configuration, including but not limited to a centrifugal pump, squirrel-cage pump, axial fan, or stored compressed gas. As shown, in some embodiments the air pump AP may be oriented such that the bubbles generated are permitted to flow through and/or between the oxidant reduction electrode 150, the charging electrode 140, and/or the fuel electrode 130. While in the illustrated embodiment the position of electrodes proximal to the side 190* facilitates installation of the air pump AP thereunder, in other embodiments the air pump AP may be located elsewhere in or associated with the cell 100, while one or more tubes or other channels are provided to channel the air or other gas to an appropriate location on the cell 100, where it may be bubbled into the ionically conductive medium.

As noted above, it is a subject of the present application that the configuration of electrochemical cells, such those embodiments described above, facilitate control of the discharge of gasses within the cells, generally without adversely affecting the flow of the ionically conductive medium within the cell and/or the performance of the cell during its operation. It may be appreciated that during charging and/or the discharging, gasses may be evolved as a byproduct of the electrochemical reactions. For example, in some embodiments, the electrochemical reactions occurring during charging of the cell 100 may be reduction-oxidation (redox) reactions. In an embodiment where the metal fuel is zinc, the ionically conductive medium may contain reducible zinc ions that are to be plated as zinc fuel on the fuel electrode 130. In one such embodiment, the reduction reaction takes place at the fuel electrode 130 (the reduction site), and may conform to $ZnO+H_2O+2e^- \rightarrow Zn+2OH^-$. The corresponding oxidation reaction occurs at the charging electrode (i.e. the charging electrode 140), and may conform to $2OH^- \rightarrow 2e^- + \frac{1}{2}O_2 + H_2O$. The charging electrode 140 is therefore understood to be producing oxygen gas within the cell 100, and thus may be characterized as an oxygen evolving electrode. In some embodiments, such as those containing a switching system, as described above, the local site of the oxygen evolution in the cell 100 may vary, depending on which of the electrode bodies 130b-e are associated with the terminal electrode body 130a, and which are associated with the separate charging electrode 140, based on the configuration of the switching system. It may be appreciated that in some embodiments different metal fuels are utilized, and thus other reactions may occur, which may also evolve oxygen or other gases in the cell 100.

In some embodiments, hydrogen may also evolve within the cell 100 (i.e. within the housing 110). For example, in an embodiment of the cell 100 that utilizes catch trays, such as those described in U.S. patent application Ser. No. 13/185,658, incorporated by reference above, the catch trays may be strategically positioned to receive particles of zinc that have separated from the fuel electrode 130. For example, such catch trays may be positioned so as to contact dendrites or other elements of fuel growth that break away from the fuel electrode 130 and fall downwards against the flow of ionically conductive medium. In some embodiments, the catch tray may comprise a catalyst configured to oxidize the fuel particles locally at the catch tray, so that the separated fuel particles do not clog up or otherwise impede cell performance, or the flow of the ionically conductive medium. In an embodiment where the metal fuel is zinc, the oxidation reaction may correspond to the equation $Zn \rightarrow Zn^{2+}+2e^-$. The zinc ions may bond with hydroxide ions that are found in the ionically conductive medium from the other electrochemical processes in the cell, in a manner that corresponds to $Zn^{2+}+ 4(OH^-) \rightarrow Zn(OH)_4^{2-}$. The $Zn(OH)_4^{2-}$ could then flow in the ionically conductive medium, and be free to be reduced as zinc fuel at the fuel electrode 130 during a future charging of the cell 100. The free electrons from the oxidation of the zinc particles, however, may combine with hydrogen ions in the ionically conductive medium from other electrochemical reactions in the cell 100, such that $H^+ + 2e^- \rightarrow H_2$, evolving hydrogen gas within the cell 100. While such hydrogen gas may generally be in a much smaller quantity than the evolved oxygen, it may be appreciated that the presence of hydrogen within the cell 100 is generally undesirable.

Figure 10:
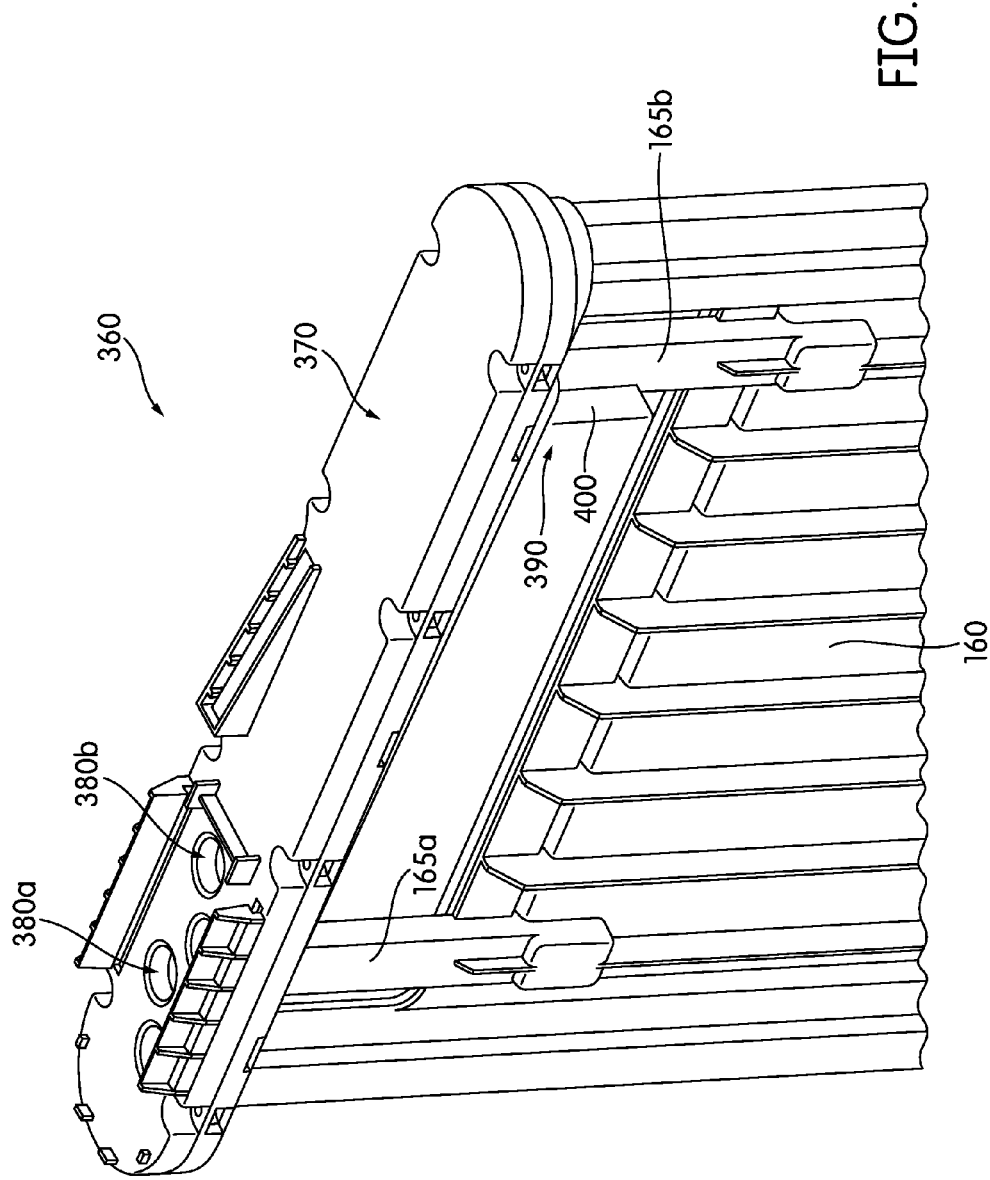
FIG. 10 illustrates a perspective view of an electrode module configured for immersion into an ionically conductive medium, containing a filter that is configured to remove ionically conductive medium from gas in an electrochemical cell.

Regardless of the type or source of gas or gasses present within the electrochemical cells, it may be appreciated that a vent or other aperture may facilitate their removal, as described in greater detail below. For example, FIG. 10 depicts an immersible electrode module 360 configured to be immersed into a quantity of ionically conductive medium to form a cell similar in configuration to the cell 100 illustrated schematically in FIG. 1. As shown in FIG. 10, the immersible electrode module 360 contains therein the immersible oxidant reduction electrode module 160, with the oxidant channels 165 (individually oxidant channel 165a and oxidant channel 165b) extending therefrom. Although obscured in the illustrated perspective view, the immersible electrode module 360 may in some embodiments be coupled to the fuel electrode 130, so as to support the fuel electrode 130 in a position spaced from the oxidant reduction electrode 150, which itself is supported in the oxidant reduction electrode module 160. Such a configuration is described in greater detail in U.S. patent application Ser. No. 13/531,962, incorporated by reference in its entirety above. As shown in FIG. 10, a cap portion 370 of the immersible electrode module 360 may be configured to engage a housing containing the ionically conductive medium, as described in greater detail below, so as to generally enclose the ionically conductive medium while immersing the oxidant electrode module 160 (and potentially the fuel electrode 130) in the ionically conductive medium, as described in greater detail below.

In the illustrated embodiment, the cap 360 is coupled to the oxidant channels 165a-b, coupling the oxidant channels 165a-b to associated oxidant channel terminals 380 (individually oxidant channel terminal 380a associated with oxidant channel 165a, and oxidant channel terminal 380b associated with oxidant channel 165b). In the illustrated embodiment, an intermediate oxidant channel extends through the cap 370 so as to position the oxidant channel terminal 380b proximal to the oxidant channel terminal 380a, despite the greater spacing between the oxidant channel 165a and the oxidant channel 165b on the oxidant reduction electrode module 160. It may be appreciated that in an embodiment a tortuous internal oxidant channel may extend through the oxidant reduction electrode module 160, so as to form a path of oxidant flow from the oxidant terminal 380a, into the oxidant channel 165a, through the oxidant electrode module 160, out of the oxidant channel 165b, and out of the oxidant terminal 380b. It may be appreciated, however, that in other embodiments the oxidant flow may be reversed. By coupling and sealing the oxidant channels 165a-b to the cap 360, the ionically conductive medium may be generally prevented from seeping into the oxidant channels 165a-b, and thus filling the space 170 formed between the oxidant reduction electrode module 160 and the oxidant reduction electrode 150.

Figure 11:
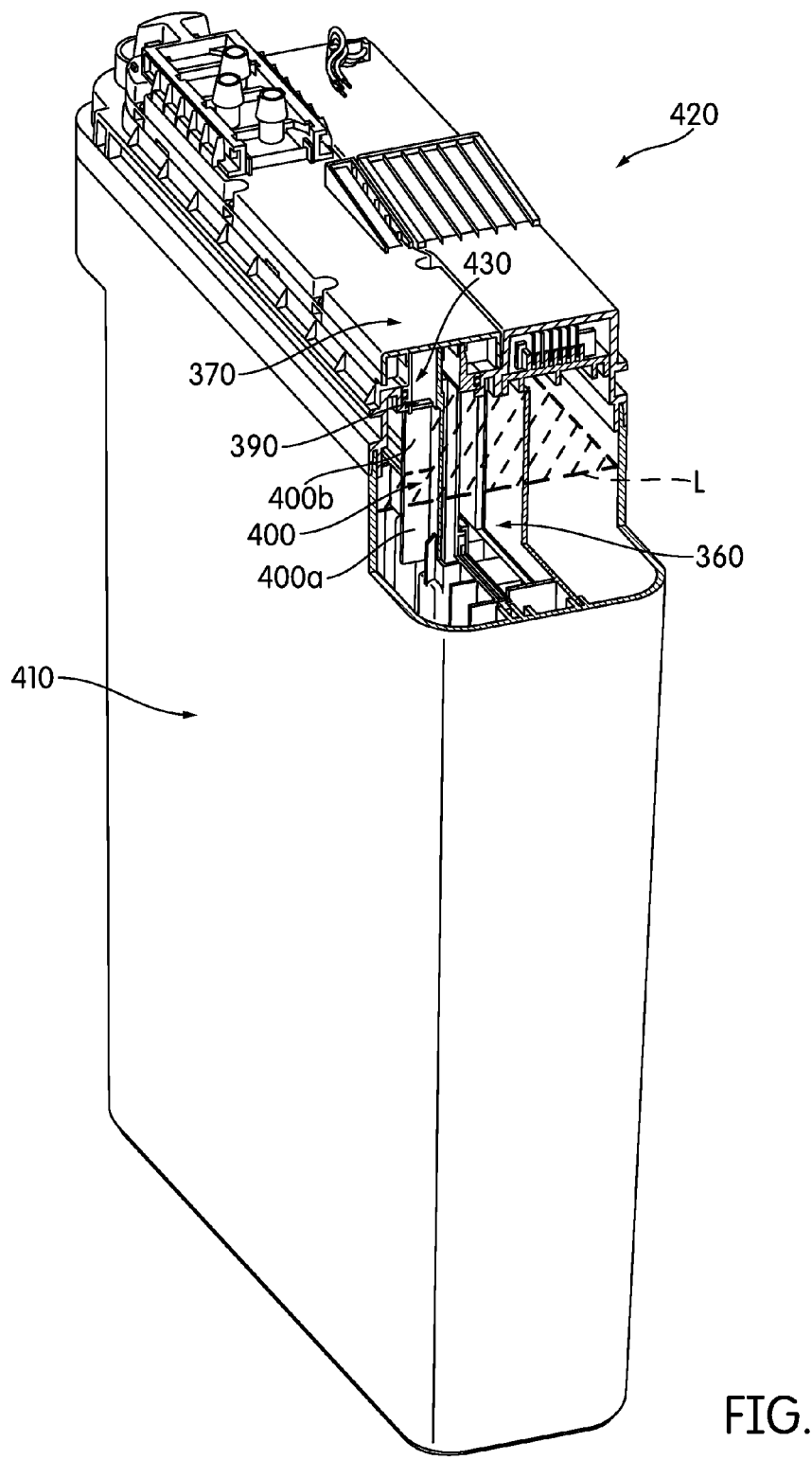
FIG. 11 illustrates a reduced perspective view of the electrochemical cell housing the electrode module and filter of FIG. 10.

Installed into and extending from the cap portion 370 in the illustrated embodiment is a filter 390 configured to facilitate the separation of gasses from the ionically conductive medium, so as to permit venting of the gasses from the cell. As shown, the filter 390 may contain a wick 400 configured to absorb a portion of the ionically conductive medium. In some embodiments, the wick 400 is of sufficient length so as to extend towards or into the ionically conductive medium when the cap 370 is positioned above the ionically conductive medium. It may be appreciated that portions of the filter 390, including the wick 400, may generally be constructed of a gas permeable, liquid absorbent material, so that it may draw a small quantity of the ionically conductive medium into the cap portion 370. Examples of such material include, but are not limited to polypropylene, polyethylene, ABS, and Noryl (i.e. modified polyphenylene ether). In various embodiments, the filter material may be in felt shape (i.e. flexible) or may be sintered to form a rigid porous block. Also, in some embodiments the filter material may comprise porous metal foams, including but not limited to comprising metals such as steel, stainless steel, bronze, and copper, and may in some embodiments be coated with a metal layer such as Ni and its alloys. It may be understood that the materials of the filter 390 may in various embodiments be described as hydrophilic, absorbent, liquid permeable, and/or hygrophilic, all of which may be utilized interchangeably to indicate that the ionically conductive medium is drawn into the filter 390, as described below. For example, shown in FIG. 11 is a reduced perspective view of the immersible electrode module 360, installed into a housing 410 that is filled with ionically conductive medium to a level L. It may be appreciated that the combination of the electrodes of the immersible electrode module 360 and the ionically conductive medium forms a cell 420. As shown, the cap 370 engages an edge of the housing 410, such that the immersible portions of the immersible electrode module 360 are immersed into the ionically conductive medium below the level L. The wick 400 therefore also has a lower portion 400a immersed below the level L of the ionically conductive medium, and an upper portion 400b rising above the level L of the ionically conductive medium. As the wick 400 is liquid absorbent, a portion of the ionically conductive medium would be drawn up the wick 400, into a body portion 430 of the filter 390.

Figure 12:
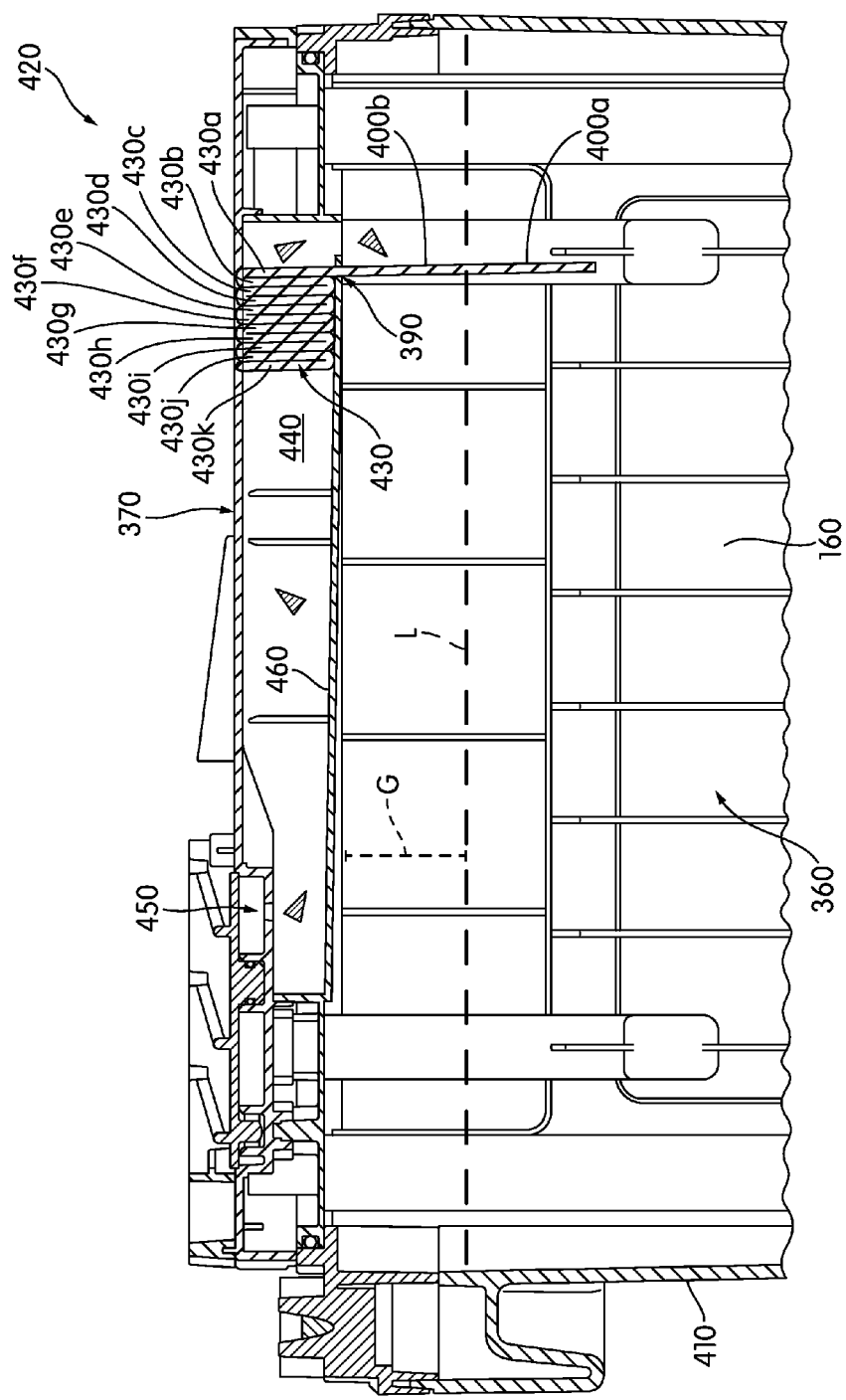
FIG. 12 illustrates a side cross-sectional view of the electrochemical cell of FIG. 11, illustrating a filter chamber containing a body portion of the filter having an angle of a floor portion thereof configured to promote movement of excess ionically conductive medium from the filter to drip back into the cell.

FIG. 12 depicts a cross sectional view of the cell 420, with the immersible electrode module 360 installed into the housing 410, cut so that the body portion 430 of the filter 390 as installed into the cap 370 is visible. In particular, in the illustrated embodiment the cap 370 contains a filter chamber 440, into which the body portion 430 of the filter 390 is installed. As shown, in some embodiments the body portion 430 may comprise more of the gas permeable liquid absorbent material, wound tortuously so as to generally fill a portion of the filter chamber 440, as described in greater detail below. It may be appreciated that gas in the electrochemical cell, either in bubble form entrained with the ionically conductive medium, or having risen above the level L of the ionically conductive medium within the housing 410, may enter the filter chamber 440 (along with the ionically conductive medium drawn by the wick 400), and may pass through the body portion 430 to vent out of a gas outlet 450 at an opposing end of the filter chamber 440 from the filter 390, as generally illustrated by the arrows.

It may be appreciated that by containing the absorbent material, the filter 390 may generally be wetted by the ionically conductive medium, while permitting the gasses to permeate therethrough. In an embodiment, the absorbent material of the filter 390 may comprise a porous, pleated polymer mesh. As shown in the figure, the bottom portion 400a of the wick 400 hangs below the liquid level in the cell to allow the filter 390 to be wetted by the ionically conductive medium. In its wetted form, the filter 390, and in particular the body portion 430, would generally be prevented from drying out, which could salt and clog the filter with solutes or other particulates in the ionically conductive medium.

As shown in FIG. 12, a base 460 of the filter chamber 440 may be angled away from the gas outlet 450, downwards towards the ionically conductive medium in the housing 410. Such an angle may vary across embodiments. It may be appreciated that the angle of the base 460 may be greater than zero degrees (horizontal), but less than 90 degrees (vertical). In some embodiments, the angle may be less than approximately 45 degrees. In some more particular embodiments, the angle may be less than approximately 25 degrees. It may be appreciated that in such embodiments, gravity would prevent excess ionically conductive medium from moving from the filter body 430 upwards towards the gas outlet 450. Instead, excess ionically conductive medium would be guided under the force of gravity to fall back into the quantity of ionically conductive medium bounded in the housing 410.

It may be appreciated that in some embodiments, the filter chamber 440 may lack the base 460, and instead may be vertically oriented. In such embodiments, any excess ionically conductive medium would fall directly back into the volume of ionically conductive medium, or may otherwise drip down the sides of the filter chamber 440. Additionally, in some embodiments, the layers of the filter body 430 may be horizontally positioned (i.e. parallel to ionically conductive medium level L) or of any other suitable arrangement. In some embodiments, the filter body 430 may be spaced from the gas outlet 450, so as to prevent ionically conductive medium from being in an absorbent location that is adjacent to the exterior of the cell 420. In some such embodiments, the filter 390 may be held in the filter chamber 440 by any appropriate mechanism, including but not limited to being glued or otherwise sealed to the generally vertical sides of the filter chamber 440, and being placed partially on a ledge or support configured to hold the filter body 430 above the volume of ionically conductive medium.

In some embodiments the gas outlet 450 may also function as a liquid inlet. In some such embodiments, additional ionically conductive medium (or water, or any other appropriate liquid), may be poured or otherwise released into the gas outlet 450, so that it may traverse the filter chamber 440, and enter into the housing 410. In some embodiments, a fluid management system may be provided in the cell 420, and may determine the height of the level L. If, for example, the level L drops by a certain amount, or to a certain level, the fluid management system may be configured to release more ionically conductive medium into the cell 420, such as through the filter chamber 440. In an embodiment, the fluid management system may comprise a level sensor configured to determine the level L of the ionically conductive medium. Such a level sensor may in various embodiments be configured to determine the height of the ionically conductive medium L, or may be configured to determine the height of an air gap G in the cell between the top of the level L of ionically conductive medium and the bottom of the cap 370. In some embodiments, the level sensor may be configured to prevent the wick 400 from being completely within the air gap G (i.e. where the lower portion 400a is entirely above the level L).

In various embodiments, the gas outlet 450 may contain or otherwise be associated with a valve, stopper, or other appropriate body configured to selectively close off the filter chamber 440, so that the cell 420 may be sealed closed, which may be beneficial when the cell 420 is being transported, stored, or so on. Additionally, the gas outlet 450 may terminate in a quick disconnect and/or have an o-ring seal, so as to facilitate connection of the filter chamber 440 to the water management system, a gas recapture system, a gas recirculation system, or any other such system that either facilitates addition of liquid into the cell 420 and/or removes gas therefrom. Additionally, in some embodiments the gas outlet 450 may include a gas-permeable liquid impermeable membrane, which may keep the cell 420 generally sealed against unwanted loss of the ionically conductive medium, but would generally not be directly exposed to the ionically conductive medium that is trapped and filtered out by the filter body 430. Such a configuration would not result in lengthy exposure of the hydrophobic membrane to the ionically conductive medium that could result in salt clogging the hydrophobic membrane when the ionically conductive medium dries.

It should be appreciated that a mist or other bubbles (i.e. microbubbles) of ionically conductive medium may be present in the air gap G (i.e. above the level L). Accordingly, in some embodiments the filter 390 may be at least partially contacting the mist, and may be wetted by the ionically conductive medium in the mist. The length of the wick 400 may be of any suitable dimension. In some embodiments, the wick 400 may be relatively short or entirely absent, thus not extending into the volume of the ionically conductive medium. Therefore, in some such embodiments hydrophilic materials in the body portion 430 may be wetted by the ionically conductive medium in the mist, without need for being drawn through a portion of the wick 400 extending into the volume of the ionically conductive medium. As such, in some embodiments, the wick 400 may be considered a portion of the filter body 430 positioned for exposure to the mist in the air gap G, whereby the filter 390 may receive the mist of ionically conductive medium therethrough to keep the filter body 430 wet. In still other embodiments, the wick 400 may generally extend through the air gap G towards the volume of ionically conductive medium, without being immersed in the ionically conductive medium, to absorb the ionically conductive medium into the filter body 430 by being exposed to the mist in the air gap G.

In operation, it may be appreciated that as the immersed portion of the wick 400 and/or the mist of ionically conductive medium in the air gap G keeps the filter body 430 wet, gas may enter the filter channel 440 through an open end thereof, through which the wick 400 protrudes, and through which gas exiting the cell 420 enters. In such an embodiment, gas may travel through the filter 390, such that the porous filter media removes the liquid ionically conductive medium. It may be appreciated that each of the tortuous winds (or pleatings) of the filter body 430 may create a plurality of filter layers, individually filter layers 430a-k of the illustrated embodiment. Although eleven layers of the filter body 430 are present in the illustrated embodiment, any other appropriate number of layers are also possible. Additionally, the pore sizes of the filter layers 430a-k may in various embodiments be of the same size or different sizes. In some embodiments, the pore sizes of the filter layers 430a-k may become progressively smaller closer to the gas outlet 450 versus closer to the wick 400, or may become progressively larger closer to the gas outlet 450 versus closer to the wick 400. Specifically, in an embodiment pore sizes in filter layer 430a may be larger than pore sizes in filter layer 430b, and so on towards filter layer 430k. In such an embodiment, gas bubbles may be trapped in the pores, and encouraged to break, such that the gas may proceed through the filter layers 430a-k while the ionically conductive medium is absorbed into the filter body 430, or condenses at the base 460 of the filter chamber 440, so as to drip back towards the ionically conductive medium in the housing 410. It may be appreciated that in some embodiments, the converse may be true, and the pore sizes may be larger closer to the gas outlet 450 than closer to the wick 400, which may filter or otherwise keep dust and dirt away from the ionically conductive medium or the remainder of the cell 420 without clogging the filter 390. Additionally in some embodiments, pore sizes may be larger closer to the base 460 of the filter chamber 440 than they are further away from the base 460. In such an embodiment, the larger pore size may facilitate easier flow of excess ionically conductive medium along the base 460 back towards the ionically conductive medium in the housing 410. In other embodiments, pore sizes may be smaller closer to the base 460 of the filter chamber 440 than they are further away from the base 460.

It may be appreciated that the pore size of the filter 390 that facilitate its impermeability to gas may be of such an appropriate size so as to trap the mist or other bubbles/microbubbles of ionically conductive medium that may be present in the air gap G. For example, in an embodiment the mist size may be approximately between 10-50 micrometers. In such an embodiment, the pores of the filter 390 may generally be between 1-100 microns. In some embodiments, the pore size may range from approximately 1-25 µm closer to filter layer 430a to approximately 25-100 µm closer to filter layer 430k, so as to progressively trap more of the mist, and separate the gas from the ionically conductive medium thereof.

Although in the illustrated embodiment the filter layers 430a-k are formed from a single folded gas permeable liquid absorbent material, in other embodiments, the filter body 430 may be constructed of multiple materials. For example, in an embodiment gas permeable but hydrophobic materials (i.e. materials that are permeable to the gas but resist permeation by the ionically conductive medium) may be positioned between some of the layers of hydrophilic/absorbent material. In one such embodiment, the absorbent material may contact and be wound along each of the hydrophobic layers, so that while gas may permeate through the entirety of the filter body 430, the hydrophobic layers receive sufficient contact with the ionically conductive medium from the hydrophilic material so as to not dry out, and be clogged by salts from the ionically conductive medium.

It should be understood that other mechanisms for limiting or suppressing unwanted gasses may be utilized in addition to the filter 390. For example, to limit or suppress hydrogen evolution at the fuel electrode 130, which in some cases may occur during the discharge mode or during quiescent (open circuit) periods of time, salts may be added to retard hydrogen evolving reactions. Salts of stannous, lead, copper, mercury, indium, bismuth, or any other material having a high hydrogen overpotential may be used. In addition, salts of tartrate, phosphate, citrate, succinate, ammonium or other hydrogen evolution suppressing additives may be added. In an embodiment, metal fuel alloys, such as Al/Mg may be used to suppress hydrogen evolution. Additionally, other additives may also or alternatively be added to the ionically conductive medium, including, but not limited to additives which enhance the electrodeposition process of the metal fuel on the fuel electrode 130, such as is described in U.S. patent application Ser. No. 13/028,496, incorporated in its entirety herein by reference. Such additives may reduce the loose dendritic growth of fuel particles, and thus the likelihood of such fuel particles separating from the fuel electrode 130, which may reduce hydrogen evolution at the catch trays configured to receive such particles, for example.

The embodiments of the cells 100 should not be considered to be limiting in any way and are provided as non-limiting examples of how the cell 100 may be charged or discharged. U.S. patent application Ser. No. 12/885,268, filed on Sep. 17, 2010, the entire content of which is incorporated herein by reference, describes embodiments of a rechargeable electrochemical cell system with charge/discharge mode switching in the cells. As also noted above, the fluid connections between multiple cells 100 in the cell assemblies may vary. Additional details of embodiments of cells that are connected in series are provided in U.S. patent application Ser. No. 12/631,484, filed Dec. 4, 2009 and incorporated herein by reference in its entirety. Although some of the cell assemblies described above have two cells enclosed therein, creating a bicell, the present invention may be practiced with additional cells stacked and fluidly connected to the illustrated cells of the cell assembly, creating tricells, quadcells, or so on. Additionally, as indicated above, in some embodiments the ionically conductive medium might be generally stationary within the cell 100, and might now flow. Alternative and additional mechanisms to increase ionic resistance between fluidly connected cells may be utilized in the present invention, such as those discussed in U.S. patent application Ser. No. 12/631,484, incorporated herein by reference.

The foregoing illustrated embodiments have been provided solely for illustrating the structural and functional principles of the present invention and are not intended to be limiting. For example, the present invention may be practiced using different fuels, different oxidizers, different electrolytes, and/or different overall structural configuration or materials. As a non-limiting example, in some embodiments the configuration of the cell 100 may be similar to those disclosed in U.S. patent applications Ser. Nos. 12/385,217 or 12/776,962, each of which are incorporated herein by reference. Thus, the present invention is intended to encompass all modifications, substitutions, alterations, and equivalents within the spirit and scope of the following appended claims.

What is claimed is:

1. An electrochemical cell system comprising:
a fuel electrode comprising a metal fuel;
an oxidant electrode for absorbing and reducing a gaseous oxidant;
a chamber configured to contain a volume of ionically conductive liquid therein, wherein the ionically conductive liquid contains a salt dissolved therein and conducts ions between the fuel and oxidant electrodes, and wherein the oxidant electrode separates the ionically conductive liquid from the gaseous oxidant; and
a filter configured to separate gas in the cell from the ionically conductive liquid, the filter comprising:
a wick configured to absorb a portion of the ionically conductive liquid therein; and
a hydrophilic body portion positioned generally above the volume of ionically conductive liquid, coupled to said wick so as to receive the absorbed portion of the ionically conductive liquid from said wick;
wherein the hydrophilic body portion contains pores therein so as to permit permeation of the gas therethrough, and
wherein the wick extends from the hydrophilic body portion towards and into the volume of ionically conductive liquid.

2. The electrochemical cell system of claim 1, wherein the wick is integrally formed with the hydrophilic body portion.

3. The electrochemical cell system of claim 1, wherein the hydrophilic body portion comprises a plurality of winds between a side of the hydrophilic body portion distal to the wick and a side of the hydrophilic body portion proximal to the wick, wherein the absorbed portion of the ionically conductive liquid is drawn from the wick along each of the plurality of winds while gas passes through the pores in each of the plurality of winds from the side of the hydrophilic body portion proximal to the wick to the side of the hydrophilic body portion distal to the wick.

4. The electrochemical cell system of claim 3, wherein the pores of each of the plurality of winds are progressively smaller from the side of the hydrophilic body portion proximal to the wick to the side of the hydrophilic body portion distal to the wick.

5. The electrochemical cell system of claim 3, wherein the pores of each of the plurality of winds are approximately the same size throughout the hydrophilic body portion.

6. The electrochemical cell system of claim 1, further comprising a housing substantially surrounding the hydrophilic body portion so as to form a filter channel.

7. The electrochemical cell system of claim 6, wherein a bottom portion of the housing is angled towards the volume of ionically conductive liquid such that excess amounts of the absorbed portion of the ionically conductive liquid in the channel is directed towards the volume of the ionically conductive liquid.

8. The electrochemical cell system of claim 7, wherein the bottom portion is angled towards the ionically conductive liquid at an angle greater than zero degrees but less than approximately 90 degrees.

9. The electrochemical cell system of claim 8, wherein the bottom portion is angled towards the ionically conductive liquid at an angle greater than zero degrees but less than approximately 45 degrees.

10. The electrochemical cell system of claim 9, wherein the bottom portion is angled towards the ionically conductive liquid at an angle greater than zero degrees but less than approximately 25 degrees.

11. The electrochemical cell system of claim 6, further comprising a channel exit at an end of the filter channel distal from the volume of ionically conductive liquid.

12. The electrochemical cell system of claim 11, wherein the channel exit comprises a gas vent configured to permit permeation of the gas therethrough, while preventing permeation of the ionically conductive liquid.

13. The electrochemical cell system of claim 12, wherein the gas vent comprises a hydrophobic membrane extending across the filter channel.

14. The electrochemical cell system of claim 6, wherein the filter channel is vertically oriented such that excess amounts of the absorbed portion of the ionically conductive liquid in the channel may fall directly towards the volume of the ionically conductive liquid.

15. The electrochemical cell system of claim 14, wherein the filter body is positioned spaced from the top of the filter channel.

16. The electrochemical cell system of claim 1, wherein at least some of the gas is encapsulated within bubbles of ionically conductive liquid.

17. The electrochemical cell system of claim 16, wherein the pores of the hydrophilic body portion are configured to capture the bubbles.

18. The electrochemical cell of claim 16, wherein said gas comprises bubbles of ionically conductive liquid within the chamber.

* * * * *